UNITED STATES PATENT OFFICE.

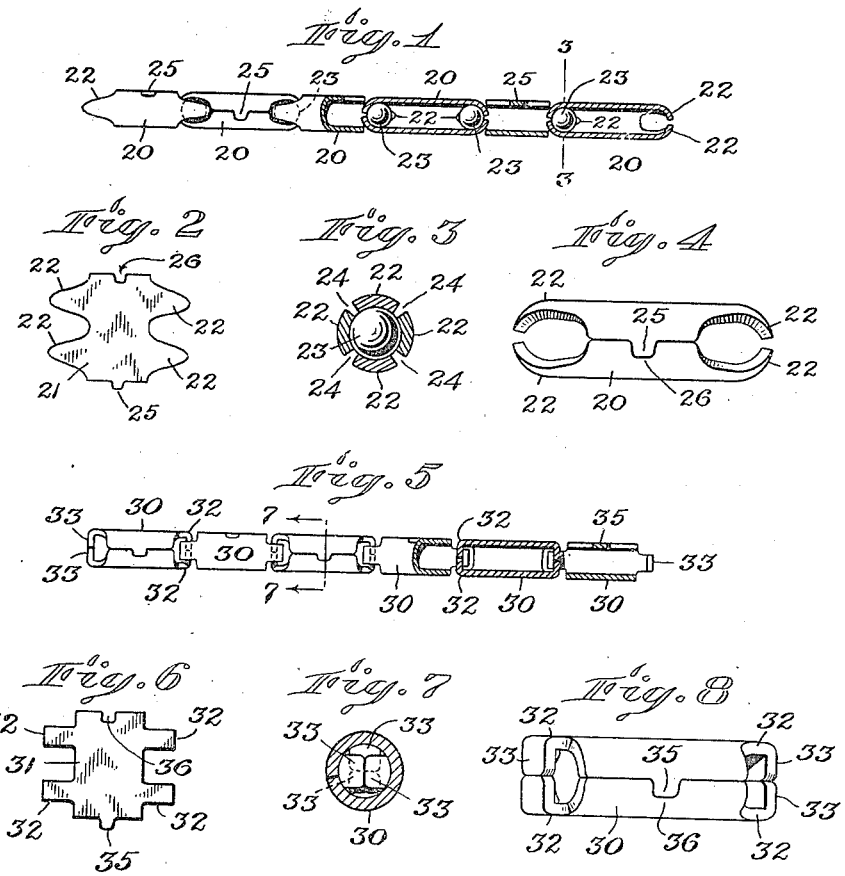

ROLLIN ABELL, OF BOSTON, MASSACHUSETTS.

FLEXIBLE SHAFTING.

1,224,886. Specification of Letters Patent. Patented May 8, 1917.

Application filed June 12, 1912. Serial No. 703,241.

*To all whom it may concern:*

Be it known that I, ROLLIN ABELL, a citizen of the United States, and resident of Boston, in the county of Suffolk and State of Massachusetts, have invented certain new and useful Improvements in Flexible Shafting, of which the following is a specification.

This invention relates to flexible shafting of the type which consists of a series of units loosely joined together in such manner that each unit is adapted to move to various angles with relation to the other units. In some respects the present invention is similar to that illustrated and described in U. S. Letters Patent 970,675, granted me September 20, 1910. One distinguishing feature between the shafting shown in that patent and the present invention is that in the former instance the units are tapering, while in the present instance they are of uniform diameter throughout their length. One disadvantage in the shafting illustrated in the said patent which is avoided by the present invention is that the shafting cannot be made to withstand the desired torque without being made unduly bulky. This is because of the manner in which the units are joined. Referring, for example, to my former construction, if metal of the desired thickness is used the diameter of the smaller end of the unit must be such as to permit bending the metal without tearing or cracking the same. This means that the diameter at the larger end of the unit must be considerably larger than the minimum diameter made possible by the thickness of the metal. On the other hand, if the maximum diameter is limited the thickness of the metal must be so limited as to permit the desired formation at the smaller end of the unit. Another disadvantage of the former construction is that the shafting has circular ridges, due to the fact that the larger end of each unit surrounds the smaller end of the next unit. This disadvantage is also avoided by the present construction, the exterior surface of the shafting being substantially smooth and cylindric whereby it is adapted to have a broad bearing in a flexible tubular casing if such is used.

Of the accompanying drawings which illustrate a number of forms in which the present invention may be embodied:

Figure 1 is a longitudinal elevation, partly in section, of a form in which balls are used at the joints.

Fig. 2 represents an elevation of a blank which is used to form one of the units shown by Fig. 1.

Fig. 3 represents a cross section in the plane indicated by line 3—3 of Fig. 1.

Fig. 4 represents, on a larger scale, a side elevation of one of the units completely formed.

Fig. 5 represents a longitudinal elevation, partly in section, of a different form of shafting which does not use balls for the joints.

Fig. 6 represents a blank used to form one of the units shown by Fig. 5.

Fig. 7 represents a cross section in the plane indicated by line 7—7 of Fig. 5.

Fig. 8 represents a perspective view, on a larger scale, of a completely formed unit made from a blank such as that shown by Fig. 6.

The same reference characters indicate the same parts wherever they occur.

There are certain structural features common to all the modifications shown, one of which is that each unit is made of ductile sheet metal, another of which is that each unit is of generally cylindric form, another of which is that the units are formed by curling or bending the blanks as distinguished from drawing them, each unit consequently having a longitudinal seam by which it may be distinguished from what is sometimes termed seamless drawn tubing. A fourth point of construction is that there are tongues at both ends of each unit.

Referring now to the form shown by Figs. 1 to 4, the shafting is made up of a series of units each indicated at 20. Each of these units is made from a blank 21, shown by Fig. 2. The blank is formed with four tapering tongues 22, two of which are at one end and two of which are at the opposite end. When the units are formed as shown by Fig. 4 and assembled as shown by Fig. 1, two tongues of one unit extend between two tongues of the next unit, the tongues being suitably spaced to enable them to occupy such relation. The tips of the tongues are curved inwardly, as clearly shown at the right of Fig. 1 and by Fig. 4, but before they are turned in, a ball 23 is inserted at each joint. Each ball is therefore engaged by two tongues at the end of one unit and by two tongues at the end of the next unit, and is almost completely surrounded by the four tongues, as shown by Fig. 3. There is, however, slight clearance between the side edges of the tongues, as indicated at 24, to provide for the desired angular movement of each unit with relation to the other units.

This style of shafting is designed especially for transmitting rotation and is not intended to be subjected to any appreciable longitudinal strain. The inwardly turned ends of the tongues 22 are adapted to withstand any longitudinal strain to which the shafting might be subjected incidentally to transmitting rotation, but the tongues are adapted to withstand considerable torsional stress, because their aggregate width is so nearly 360 degrees of the circumference of the shafting. The degree of clearance as indicated at 24 depends, of course, upon the maximum angular movement of which the units must be capable.

In order to increase the rigidity of the units without increasing the thickness of the metal, each blank is provided with a projecting portion 25 at one side edge and with a notch 26 in the opposite side edge for the reception of the portion 25. When the blank is rolled into tubular form, the two side edges are brought together so that they become coextensive. The rolling or curling operation carries the projecting portion 25 into the notch 26. The portion 25 and notch 26 are preferably so proportioned as to cause the one to fit closely into the other, as shown by Fig. 4; and in order to facilitate the insertion of the projecting portion into the notch, the corners are slightly rounded or beveled. The construction just described holds the two coextensive edges rigidly with reference to relative longitudinal movement and prevents skewing of the unit as the result of the torsional stress.

The provision of the ball 23 at each joint renders the relative angular movements of the units very smooth and easy and prolongs the life of the shafting, because it avoids harsh wearing away of the tongues.

In the form shown in Figs. 5 to 8, each unit indicated at 30 is made from a blank 31. This blank also has tongues at each end, the same being indicated at 32. These tongues, when formed as shown by Figs. 5 and 8, constitute hook portions, and each one of them is hooked behind two similar hook portions of the next unit of the shaft. The hooks of each pair form an eye in which the hooks of the next unit are loosely confined, the units being thus permanently connected so that they will not pull apart, and at the same time being capable of relative angular movement. Each hook portion sustains longitudinal stress independently of its companion, and the strength of the shaft, with regard to longitudinal stress, is very great in view of the size of the units and stock used. The units of this modification are shown as being provided with projecting portions 35 and notches 36 in the same form and for the same purpose as the projections 25 and notches 26 in the form first described.

Having thus explained the nature of my said invention and described a way of constructing and using the same, although without attempting to set forth all the forms in which it may be made or all the modes of its use, what I claim is:—

1. A shaft of the character described comprising a series of similar pieces of ductile sheet metal each having a pair of hook portions at each end, each said hook portion being arranged in hooked relation to a pair of such hook portions of the contiguous piece whereby it is adapted to sustain longitudinal stress from one piece to the next, independently of its companion hook portion.

2. A flexible shaft comprising a series of similar pieces each having a pair of tongues at each end, the tongues of each said pair having bends and forming an eye, the free end portions of each said pair of tongues being arranged in an eye formed by such tongues of the contiguous piece.

3. A shaft of the character described comprising a series of similar members each having a body portion and two pairs of hook portions, said hook portions extending in opposite directions from the ends of said body portion, each said hook portion being arranged in hooked relation with and engaging a pair of such hook portions of the next such member, said hook portions being arranged to keep said members connected.

4. A device for the purpose explained consisting of a single piece of ductile sheet metal having a body portion and two pairs of hook portions projecting longitudinally in opposite directions from the ends of the body portion, the free ends of said hook portions of each pair extending toward each other and forming an eye to confine such free ends of another such device.

5. A device for the purpose explained consisting of a single piece of ductile sheet metal having two pairs of hook portions extending in opposite directions, the hook portions of each said pair being arranged to form an eye adapted to receive and confine the free ends of a pair of such hook portions of another such piece.

In testimony whereof I have affixed my signature, in presence of two witnesses.

ROLLIN ABELL.

Witnesses:
P. W. PEZZETTI,
W. P. ABELL.